United States Patent [19]
Yanus et al.

[11] Patent Number: 5,283,143
[45] Date of Patent: * Feb. 1, 1994

[54] ELECTROPHOTOGRAPHIC IMAGING MEMBER CONTAINING ARYLAMINE TERPOLYMERS WITH CF₃ SUBSTITUTED MOIETIES

[75] Inventors: John F. Yanus, Webster; William W. Limburg, Penfield; Dale S. Renfer, Webster; Damodar M. Pai, Fairport, all of N.Y.

[73] Assignee: Xerox Corporation, Stamford, Conn.

[*] Notice: The portion of the term of this patent subsequent to Apr. 13, 2010 has been disclaimed.

[21] Appl. No.: 797,753

[22] Filed: Nov. 25, 1991

[51] Int. Cl.⁵ .................. G03G 15/02; G03G 15/00
[52] U.S. Cl. ........................... 430/59; 430/56; 430/58
[58] Field of Search ................. 430/96, 66, 67, 56, 430/57, 58

[56] References Cited

U.S. PATENT DOCUMENTS

| | | | |
|---|---|---|---|
| 3,844,781 | 10/1974 | Tsuchiya et al. | 96/1.5 |
| 3,890,146 | 6/1975 | Nagashima et al. | 96/1.5 |
| 4,047,948 | 9/1977 | Horgan | 96/1.5 R |
| 4,052,205 | 10/1977 | Stolka et al. | 96/1 PC |
| 4,265,990 | 5/1981 | Stolka et al. | 430/59 |
| 4,273,846 | 6/1981 | Pai et al. | 430/59 |
| 4,346,158 | 8/1982 | Pai et al. | 430/59 |
| 4,388,392 | 6/1983 | Kato et al. | 430/58 |
| 4,415,641 | 11/1983 | Goto et al. | 430/59 |
| 4,588,666 | 5/1986 | Stolka et al. | 430/59 |
| 4,588,667 | 5/1986 | Jones et al. | 430/73 |
| 4,801,517 | 1/1989 | Frechet et al. | 430/59 |
| 4,806,443 | 2/1989 | Yanus et al. | 430/56 |
| 4,806,444 | 2/1989 | Yanus et al. | 430/56 |
| 4,818,650 | 4/1989 | Limburg et al. | 430/56 |
| 5,030,532 | 7/1991 | Limburg | 430/59 |
| 5,202,408 | 4/1993 | Yanus et al. | 430/56 |

FOREIGN PATENT DOCUMENTS

| | | | |
|---|---|---|---|
| 1171431 | 7/1984 | Canada . | |
| 63-065444 | 3/1988 | Japan | 430/96 |

Primary Examiner—Marion E. McCamish
Assistant Examiner—Stephen C. Crossan

[57] ABSTRACT

An electrophotographic imaging member including a charge generation layer and a hole transport layer, at least the charge generation layer or charge transport layer comprising a polyarylamine polymer represented by the following formula:

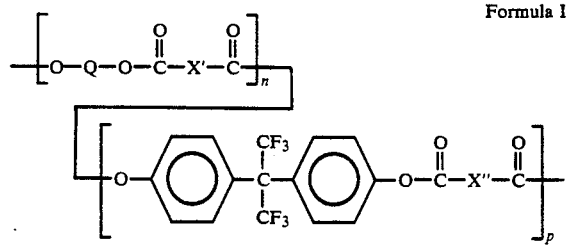

Formula I wherein:
n is between about 5 and about 5,000
p is between about 5 and about 5,000
X' and X" are independently selected from a group having bifunctional linkages, and
Q is a divalent group derived from certain hydroxy terminated arylamine reactants.

9 Claims, No Drawings

ELECTROPHOTOGRAPHIC IMAGING MEMBER CONTAINING ARYLAMINE TERPOLYMERS WITH CF₃ SUBSTITUTED MOIETIES

BACKGROUND OF THE INVENTION

This invention relates in general to electrophotographic imaging systems and, more specifically, to electrophotographic imaging members utilizing polymeric tertiary arylamine compounds.

In the art of electrophotography an electrophotographic plate comprising a photoconductive insulating layer on a conductive layer is imaged by first uniformly electrostatically charging the surface of the photoconductive insulating layer. The plate is then exposed to a pattern of activating electromagnetic radiation such as light, which selectively dissipates the charge in the illuminated areas of the photoconductive insulating layer while leaving behind an electrostatic latent image in the non-illuminated areas. This electrostatic latent image may then be developed to form a visible image by depositing finely divided electroscopic toner particles on the surface of the photoconductive insulating layer. These toner particles may be applied to the surface in dry form or dispersed in a liquid carrier medium. The resulting visible toner image can be transferred to a suitable receiving member such as paper. This imaging process may be repeated many times with reusable photoconductive insulating layers.

As more advanced, higher speed electrophotographic copiers, duplicators and printers were developed, degradation of image quality was encountered during cycling. Moreover, complex, highly sophisticated, duplicating and printing systems operating at high speeds have placed stringent requirements including narrow operating limits on photoreceptors. For example, the numerous layers found in many modern photoconductive imaging members must be highly flexible, adhere well to to adjacent layers, be mechanically compatible for flexible belt photoreceptors, and exhibit predictable electrical characteristics within narrow operating limits to provide excellent toner images over many thousands of cycles. There is also a great current need for long service life, flexible photoreceptors in compact imaging machines that employ small diameter support rollers for photoreceptor belt systems compressed into a very confined space. Small diameter support rollers are also highly desirable for simple, reliable copy paper stripping systems which utilize the beam strength of the copy paper to automatically remove copy paper sheets from the surface of a photoreceptor belt after toner image transfer. However, small diameter rollers, e.g. less than about 0.75 inch (19 mm) diameter, raise the threshold of mechanical performance criteria for photoreceptors to such a high level that spontaneous photoreceptor belt material failure becomes a frequent event for flexible belt photoreceptors.

One type of multilayered photoreceptor that has been employed as a belt in electrophotographic imaging systems comprises a substrate, a conductive layer, a charge blocking layer a charge generating layer, and a charge transport layer. The charge transport layer often comprises an activating small molecule dispersed or dissolved in a polymeric film forming binder. Generally, the polymeric film forming binder in the transport layer is electrically inactive by itself and becomes electrically active when it contains the activating molecule. The expression "electrically active" means that the material is capable of supporting the injection of photogenerated charge carriers from the material in the charge generating layer and is capable of allowing the transport of these charge carriers through the electrically active layer in order to discharge a surface charge on the active layer. The multilayered type of photoreceptor may also comprise additional layers such as an anti-curl backing layer, an adhesive layer, and an overcoating layer. Adhesive layers are often required to overcome inadequate adhesion between substrate, blocking and generator layers. The elimination of this layer would remove a fabrication step, resulting in processing time savings, reduced costs and an increasing yield due to the decrease in handling. In addition it would eliminate potential electrical problems often associated with interfaces. Although excellent toner images may be obtained with multilayered belt photoreceptors that are developed with dry developer powder (toner), it has been found that these same photoreceptors become unstable when employed with liquid development systems. These photoreceptors suffer from cracking, crazing, delamination, crystallization of active compounds, phase separation of activating compounds and extraction of activating compounds caused by contact with the organic carrier fluid, isoparaffinic hydrocarbons e.g. Isopar ®, commonly employed in liquid developer inks which, in turn, markedly degrade the mechanical integrity and electrical properties of the photoreceptor. More specifically, the organic carrier fluid of a liquid developer tends to leach out activating small molecules, such as the arylamine containing compounds typically used in the charge transport layers. Representative of this class of materials are: N,N'-diphenyl-N,N'-bis(3-methylphenyl)-[1,1'-biphenyl]-4,4'-diamine; bis-(4-diethylamino-2-methylphenyl)-phenylmethane; 2,5-bis-(4'-dimethylaminophenyl)-1,3,4-oxadiazole; 1-phenyl-3-(4'-diethylaminostyryl)-5-(4''-diethylaminophenyl)pyrazoline; 1,1-bis-(4-(di-N,N'-p-methylphenyl)-aminophenyl)-cyclohexane; 4-diethylaminobenzaldehyde-1,1-diphenylhydrazone; 1,1-diphenyl-2(p-N,N-diphenylaminophenyl)-ethylene; N-ethylcarbazole-3-carboxaldehyde-1-methyl-1-phenylhydrazone. The leaching process results in crystallization of the activating small molecules, such as the aforementioned arylamine compounds, onto the photoreceptor surface and subsequent migration of arylamines into the liquid developer ink. In addition, the ink vehicle, typically a $C_{10}$–$C_{14}$ branched hydrocarbon, induces the formation of cracks and crazes in the photoreceptor surface. These effects lead to copy defects and shortened photoreceptor life. The degradation of the photoreceptor manifests itself as increased background and other printing defects. The ink vehicle and its vapor, may penetrate the photoreceptor layers exacerbating adhesion failures which lead to complete physical photoreceptor failure.

The leaching out of the activating small molecule also increases the susceptibility of the transport layer to solvent/stress cracking when the belt is parked over a belt support roller during periods of non-use. Some carrier fluids also promote phase separation of the activating small molecules, such as arylamine compounds and their aforementioned derivatives, in the transport layers, particularly when high concentrations of the arylamine compounds are present in the transport layer binder. Phase separation of activating small molecules also adversely alters the electrical and mechanical properties of a photoreceptor. Although flexing is normally not encountered with rigid, cylindrical, multilayered photoreceptors which utilize charge transport layers containing activating small molecules dispersed or dissolved in a polymeric film forming binder, electrical degradation is similarly encountered during development with liquid developers. In addition, even non-flexing photoreceptors can suffer from adhesion failure brought about by solvent penetration. Sufficient degradation of these photoreceptors by liquid developers can occur in less than eight hours of use thereby rendering the photoreceptor unsuitable for even low quality xerographic imaging purposes.

Photoreceptors have been developed which comprise charge transfer complexes prepared with polymeric molecules. For example, charge transport complexes formed with polyvinyl carbazole are disclosed in U.S. Pat. Nos. 4,047,948, 4,346,158 and 4,388,392. Photoreceptors utilizing polyvinyl carbazole layers, as compared with current photoreceptor requirements, exhibit relatively xerographic performance in both electrical and mechanical properties. Polymeric arylamine molecules prepared from the condensation of di-secondary amine with a di-iodo aryl compound are disclosed in European patent publication 34,425, published Aug. 26, 1981 and issued May 16, 1984. Since these polymers are extremely brittle and form films which are very susceptible to physical damage, their use in a flexible belt configuration is precluded. Thus, in advanced imaging systems utilizing multilayered belt photoreceptors exposed to liquid development systems, cracking and crazing have been encountered in critical charge transport layers during belt cycling. Cracks developing in charge transport layers during cycling can be manifested as print-out defects adversely affecting copy quality. Furthermore, cracks in the photoreceptor pick up toner particles which cannot be removed in the cleaning step and may be transferred to the background in subsequent prints. In addition, crack areas are subject to delamination when contacted with blade cleaning devices thus limiting the options in electrophotographic product design. A hole transporting polymer which produces an easy to clean surface would enable less aggressive cleaning systems to be used resulting in less wear, and hence longer life, of the photoreceptor.

Photoreceptors may need to have surfaces with special properties. The use of an overcoat has been one approach to achieve this. However, an adhesive layer has been found necessary for some overcoats to be mechanically functional. An adhesive layer, in addition to requiring an extra processing step, also introduces additional interfaces which may impact electrical performance. The use of an adhesion promoting transporting polymer for the transport layer can eliminate the need for an additional adhesive layer.

Photoreceptors having charge transport layers containing small molecule arylamine compounds dispersed or dissolved in various resins such as polycarbonates are known in the art. Similarly, photoreceptors utilizing polymeric arylamine containing molecules such as polyvinyl carbazole and polymethacrylates possessing pendant arylamines are also known. Further, condensation polymers of a di-secondary amine with a di-iodo aryl compound are described in the prior art. Moreover, various polymers derived from a reaction of certain monomers with aromatic amines such as N,N'-diphenyl-N,N'-bis(3-hydroxyphenyl)-[1,1'-biphenyl]-4,4'-diamine have recently been described.

Recently photoreceptors having charge transport layers containing charge transporting arylamine polymers have been described in the patent literature. These polymers include the products of a reaction involving a dihydroxy arylamine reactant and are described for example in U.S. Pat. Nos. 4,806,443, 4,806,443, 4,801,517 and 4,818,650, the entire disclosures of these patents being incorporated herein by reference. Although these polymers form excellent charge transport layers, many other polymeric derivatives of dihydroxy arylamines do not meet the numerous stringent requirements of sophisticated automatic electrophotographic systems. For example, the polymeric reaction products of dihydroxy arylamines and 1,3-diiodopropane form charge transport layers that possess very poor mechanical properties, are soft and non-robust and are of low molecular weight.

INFORMATION DISCLOSURE STATEMENT

U.S. Pat. No. 4,806,443 to Yanus et al, issued Feb. 21, 1989—An electrostatographic imaging member is disclosed in which the imaging member comprises a substrate and an electroconductive layer, the imaging member comprising a polymeric arylamine compound represented by a formula shown in the abstract. The polymeric arylamine compound is a reaction product of a specific glycol chloroformate and a specific dihydroxy arylamine compound. See, for example, column 9, lines 51–65. The glycol chloroformate possesses a flexible unit to reduce brittleness and improve other mechanical properties of the polymer. See, for example, column 11, lines 1–48.

U.S. Pat. No. 4,806,444 to Yanus et al, issued Feb. 21, 1989—An electrostatographic imaging member is disclosed in which the imaging member comprises a substrate and an electroconductive layer, the imaging member comprising a polymeric arylamine compound represented by a formula shown in the abstract.

U.S. Pat. No. 4,801,517 to Frechet et al, issued Jan. 31, 1989—An electrostatographic imaging member is disclosed in which the imaging member comprises a substrate and at least one electroconductive layer, the imaging member comprising a polymeric amine compound represented by a formula shown in the abstract.

U.S. Pat. No. 4,818,650 to Limburg et al, issued Apr. 4, 1989—An electrostatographic imaging member is disclosed in which the imaging member comprises a substrate and at least one electrophotoconductive layer, the imaging member comprising a polymeric arylamine compound represented by a formula shown in the abstract.

Canadian Patent 1,171,431 corresponds to European Patent Application 34,425 to Xerox, published Aug. 26, 1981, issued May 16, 1984. Condensation polymers of a di-secondary amine with a di-iodo aryl compound are described, for example, in working Examples IX and X.

Stolka et al, Photoconductivity and Hole Transport in Polymers of Aromatic Amine-Containing Methacrylates, Journal of Polymer Science: Polymer Chemistry Edition, Vol. 21, 969 (1983)—Hole transport is described in high molecular weight arylamine-substituted polymethacrylates. Synthesis of the monomers, their polymerization, and the general properties of these polymers are also discussed.

U.S. Pat. No. 4,052,205 to Stolka et al, issued Oct. 4,

1977—A photoconductive imaging member is disclosed comprising various active polymers, such as poly-N-vinyl carbazole, in a transport layer, e.g. line 45, column 5 to line 27, column 6. Derivatives of the active polymers may be hydroxy substituted e.g. column 5, lines 62-65.

U.S. Pat. No. 4,265,990 to Stolka et al, issued May 5, 1981—Transport layers are disclosed comprising small molecule arylamines and a polycarbonate resin binder.

U.S. Pat. No. 4,415,641 to Goto et al, issued Nov. 15, 1983—An electrophotographic light-sensitive element is disclosed comprising a carbazole derivative (see column 3, lines 1-14). $R_2$ can represent a hydroxy group.

U.S. Pat. No. 4,588,666 to Stolka et al, issued May 13, 1986—A hole transporting molecule is disclosed comprising alkoxy derivatives of tetra phenyl biphenyl diamine (see column 3, lines 33-66). $R_1$ and $R_2$ represent alkoxy groups which include methoxy. Resins such as polyvinyl carbazoles, polycarbonate resins, epoxy resins, polyvinyl butyrals, polyhydroxyether resins may be used as a binder for the hole transporting molecule.

U.S. Pat. No. 4,047,948 to A. M. Horgan, issued Sep. 13, 1977—A photoreceptor is disclosed comprising layers which may contain polyvinyl carbazole. The use of small molecule arylamine activating compounds in transport layers is also disclosed. The preferred small molecule resin binder is a polycarbonate resin.

U.S. Pat. No. 4,346,158 to Pai et al, issued Aug. 24, 1982—A photoreceptor is disclosed comprising layers which may contain polyvinyl carbazole. The use of small molecule arylamine activating compounds in transport layers is also disclosed. The preferred small molecule resin binder is a polycarbonate resin.

U.S. Pat. No. 4,388,392 to Kato et al, issued Jun. 14, 1987—A photoreceptor is disclosed comprising layers which may contain polyvinyl carbazole. The use of an electron-donating polycyclic aromatic hydrocarbon incorporated in an electron-donative polymeric photoconductor in a charge transporting layer is also disclosed.

U.S. Pat. No. 4,273,846 to Pai et al, issued Jun. 16, 1981—An imaging member is disclosed comprising a polycarbonate resin material and an arylamine (see the general formula, column 2, lines 21-34). Poly-N-vinyl carbazole may be employed in the generator layer.

U.S. Pat. No. 3,844,781 to Tsuchiya et al, issued Oct. 29, 1974—Various photoconductive materials are disclosed containing substituents such as hydroxyl, amino and alkoxy groups.

U.S. Pat. No. 3,890,146 to Nagashima et al, issued Jun. 17, 1975—Various photoconductive materials are disclosed containing substituents such as hydroxyl, amino and alkoxy groups.

U.S. Pat. No. 4,588,667 to Jones, issued May 13, 1986—Various overcoated electrophotographic imaging members are disclosed including a multilayered imaging member having a substrate, a titanium metal layer, a siloxane blocking layer, an adhesive layer, a charge generating binder layer, and a charge transport layer. The transport layer may contain from about 25 to about 75 percent by weight of arylamine transport material in a resin binder such as polycarbonate resin.

Thus, there is a continuing need for multilayered photoreceptors having improved resistance to cracking, crazing, delamination, softening, swelling, crystallization of active compounds, phase separation of active compounds and leaching of active compounds. In addition to the ink compatibility requirements the active compounds in charge transport layers must also have high resistivity for charge retention, high hole mobility for rapid discharge, and mechanical toughness for long life. Further, there is a continuing need for multilayered photoreceptors having improved resistance to cracking, crazing, delamination, crystallization of active compounds, and phase separation of active compounds when used in dry development applications where life is limited by the lack of robustness of the multilayered photoreceptor.

SUMMARY OF THE INVENTION

It is, therefore, an object of the present invention to provide an improved electrophotographic imaging member containing a polymeric tertiary arylamine compound which overcome the above-noted disadvantages.

It is yet another object of the present invention to provide an improved electrophotographic imaging member containing a hole transporting material which exhibits greater resistance to cracking and crazing induced by liquid ink carrier fluid.

It is yet another object of the present invention to provide an improved electrophotographic imaging member containing a hole transporting material which exhibits greater resistance to cracking and crazing when mechanically cycled in a belt-type configuration around a narrow diameter roller.

It is a further object of the present invention to provide an electrophotographic imaging member containing a hole transporting material which exhibits improved resistance to component leaching during liquid development.

It is still another object of the present invention to provide an electrophotographic imaging member containing a hole transporting material which exhibits improved resistance to component crystallization during liquid development.

It is a further object of the present invention to provide an electrophotographic imaging member containing a hole transporting material which retains stable electrical properties during cycling.

It is yet another object of the present invention to provide an electrophotographic imaging member containing an improved hole transporting material which resists abrasion and wear when exposed to blade cleaning devices and dry xerographic developers.

It is a further object of the present invention to provide an electrophotographic imaging member an improved hole transporting material which exhibits resistance to softening and swelling when exposed to liquid ink carrier fluid.

It is a further object of the present invention to provide an electrophotographic imaging member an improved hole transporting material which possesses enhanced adhesive properties.

The foregoing objects and others are accomplished in accordance with this invention by providing an electrophotographic imaging member comprising a charge generation layer and a hole transport layer, at least the charge generation layer or charge transport layer comprising a polyarylamine polymer represented by the following formula:

Formula I

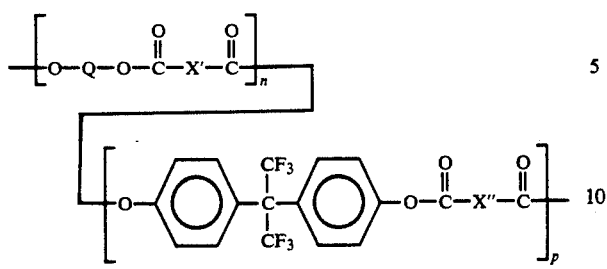

wherein:
n is between about 5 and about 5,000
p is between about 5 and about 5,000
X' and X" are independently selected from a group having bifunctional linkages,
Q is a divalent group derived from a hydroxy terminated arylamine reactant containing the group:

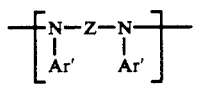

or

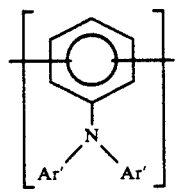

wherein:
Ar' is selected from the group consisting of:

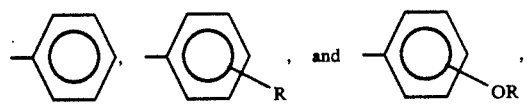

Z is selected from the group consisting of:

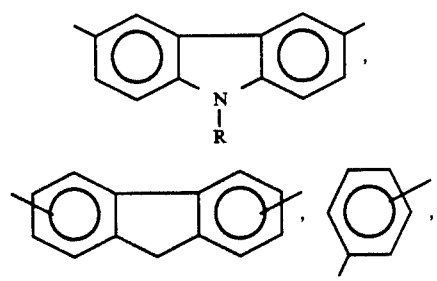

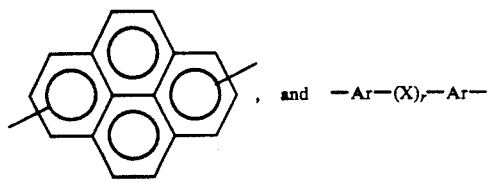

r is 0 or 1,
R is selected from the group consisting of —CH$_3$, —C$_2$H$_5$, —C$_3$H$_7$, and —C$_4$H$_9$,
X is selected from the group consisting of:

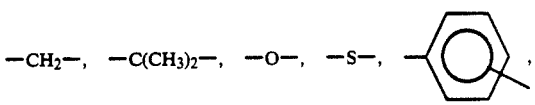

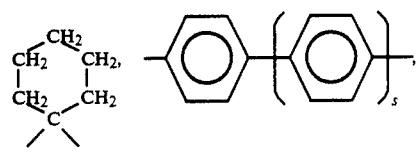

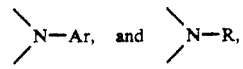

and
Ar is selected from the group consisting of:

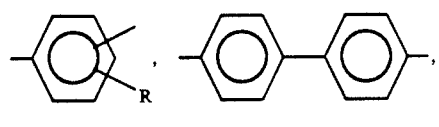

and

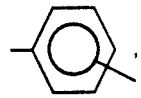

and the weight average molecular weight of the polyarylamine polymer is between about 10,000 and about 1,000,000.

More preferably, the polyarylamine polymer is represented by the formula:

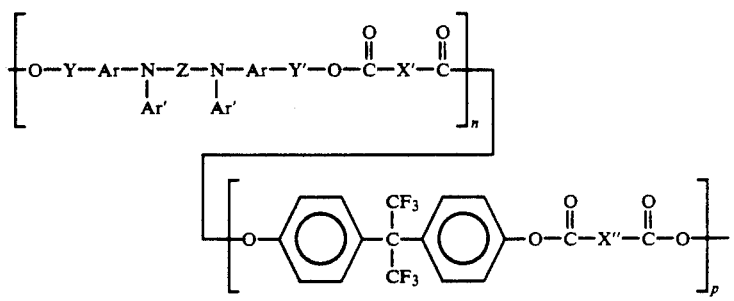

wherein:
n is between about 5 and about 5,000, p if between about 5 and about 5,000,
Z is selected from the group consisting of:

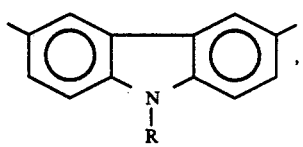

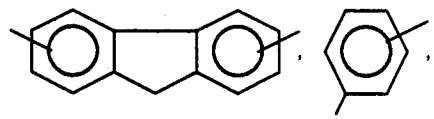

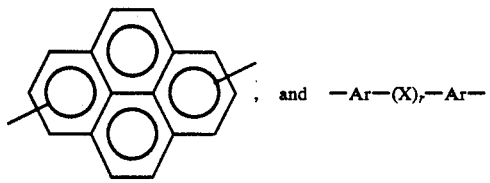

r is 0 or 1,
Ar is selected from the group consisting of:

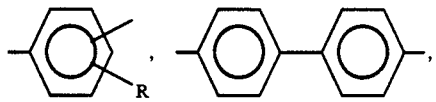

and

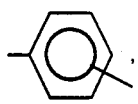

R is selected from the group consisting of —CH$_3$, —C$_2$H$_5$, —C$_3$H$_7$, and —C$_4$H$_9$,
X is selected from the group consisting of:

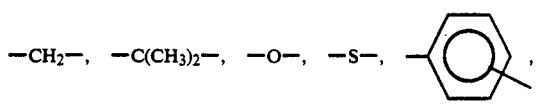

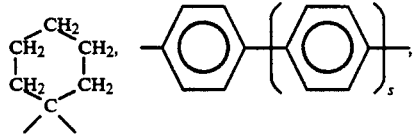

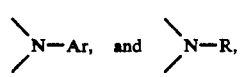

S is 0, 1 or 2,
Ar' is selected from the group consisting of:

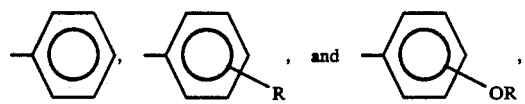

X' AND X" are independently selected from a group having bifunctional linkages, and
Y and Y' are independently selected from a group represented by the formula:

wherein
t is 0, 1, 2, 3, or 4.

Generally, the polymeric arylamine compounds of this invention may be prepared by reacting a dihydroxy arylamine compound with a coreactant diformoyl chloride compound represented by the formula:

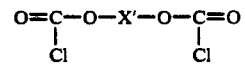

wherein X' is selected from the group consisting of bifunctional linkages such as alkylene, arylene, substituted alkylene, substituted arylene and ether segments. Generally, the ether, alkylene and substituted alkylene bifunctional linkages contain from 1 to 25 carbon atoms. In addition a second diformoyl chloride compound is included in the reaction, the compound being represented by the formula:

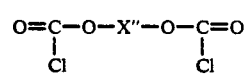

wherein X" is selected from the group consisting of bifunctional linkages such as alkylene, arylene, substituted alkylene, substituted arylene, and ether segments, this linkage may be the same as that selected for X'.

Illustrative examples of substituted or unsubstituted alkylene groups include those containing from about 1 to about 25 carbon atoms, and preferably from 1 to about 10 carbon atoms, such as methylene, dimethylene, trimethylene, tetramethylene, 2,2-dimethyltrimethylene, pentamethylene, hexamethylene, heptamethylene, and the like.

Illustrative examples of substituted or unsubstituted arylene linkages include the following:

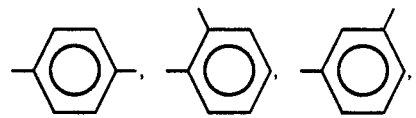

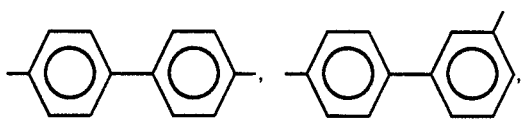

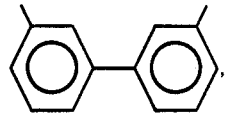

Examples of ether segments include those containing from about 2 to about 25 carbon atoms, such as —CH$_2$OCH$_2$—, —CH$_2$CH$_2$—OCH$_2$CH$_2$—, —CH$_2$CH$_2$—OCH$_2$—CH$_2$CH$_2$CH$_2$OCH$_2$CH$_2$—, —CH$_2$CH$_2$—(OCH$_2$CH$_2$)$_2$—, —CH$_2$CH$_2$CH(CH$_3$)OCH$_2$C-

$H_2$—, and the like. Examples of alkyl substituents include those with from 1 to about 25 carbon atoms, such as methyl, ethyl, propyl, isopropyl, butyl, isobutyl, pentyl, 2-methylpentyl, hexyl, octyl, nonyl, decyl, and the like, with methyl, ethyl, propyl, and butyl being preferred. Aryl substituents include those with from 6 carbon atoms to about 24 carbon atoms, such as phenyl, tolyl, ethylphenyl, and naphthyl. The aryl groups can be substituted with alkoxy, hydroxy, halo, cyano, alkoxyalkyl, and the like.

Typical compounds represented by the above formula for the diformoyl chloride compound include:

$$Cl-\overset{O}{\underset{\|}{C}}-OCH_2CH_2CH_2CH_2O-\overset{O}{\underset{\|}{C}}-Cl$$

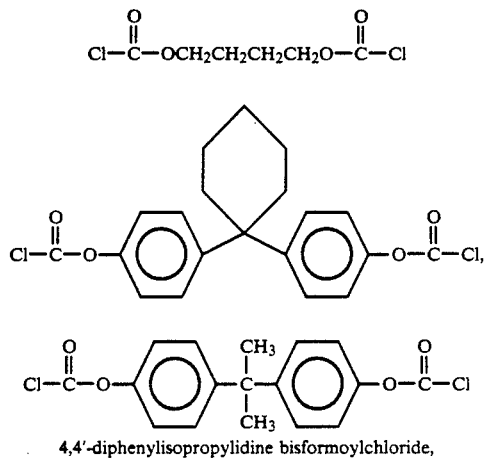

4,4'-diphenylisopropylidine bisformoylchloride,

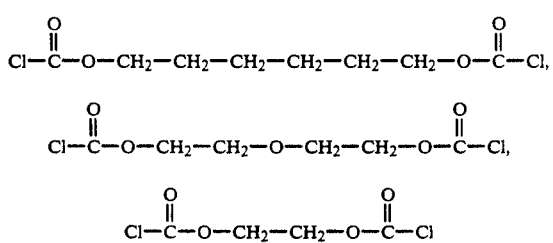

$$Cl-\overset{O}{\underset{\|}{C}}-O-CH_2-CH_2-CH_2-CH_2-CH_2-CH_2-O-\overset{O}{\underset{\|}{C}}-Cl,$$

$$Cl-\overset{O}{\underset{\|}{C}}-O-CH_2-CH_2-O-CH_2-CH_2-O-\overset{O}{\underset{\|}{C}}-Cl,$$

$$Cl-\overset{O}{\underset{\|}{C}}-O-CH_2-CH_2-O-\overset{O}{\underset{\|}{C}}-Cl$$

and

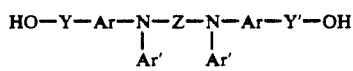

In one embodiment, polymeric arylamine compounds utilized in the imaging members of this invention may be prepared by reacting the diformoyl chloride compound with a dihydroxy arylamine compound represented by the formula:

$$HO-Y-Ar-\underset{Ar'}{N}-Z-\underset{Ar'}{N}-Ar-Y'-OH$$

wherein:

Ar, Ar', Z, Y and Y' are as defined above.

Compounds represented by the above hydroxy arylamine formula may be prepared by hydrolyzing an alkoxy arylamine. A typical process for preparing alkoxy arylamines is disclosed in Example 1 of U.S. Pat. No. 4,588,666 to Stolka et al, the entire disclosure of this patent being incorporated herein by reference.

Typical compounds represented by the above formula for hydroxy arylamine compounds include:

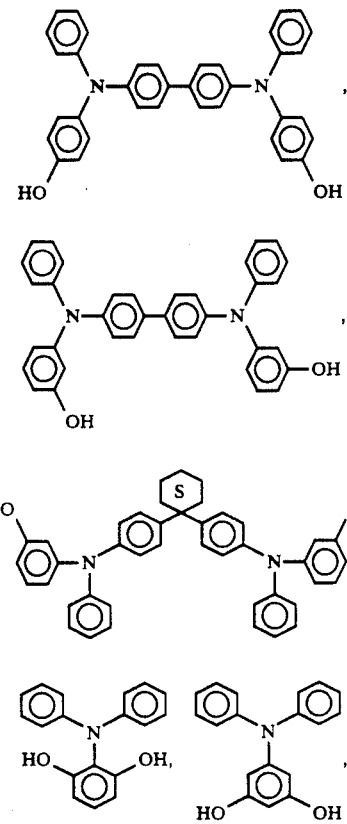

Compounds represented by the above hydroxy arylamine formula where t is 0, 1, 2, 3 or 4 may be prepared by reacting an arylamine compound having the formula:

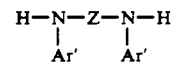

wherein: Z and Ar' are as defined above. Typical compounds represented by this formula include N,N'-diphenylbenzidine, N,N'-diphenyl-p-terphenyl diamine, N,N'-diphenyl-p,p'-diaminodiphenylether, N,N'-diphenyl-p,p'-cyclohexylidene diphenyldiamine, N,N'-diphenyl-p,p'-isopropylidene diphenyldiamine, N,N'-diphenyl-p,p'-methylidene diphenyldiamine, and the like. This arylamine compound is reacted with an iodobenzene compound such as m-bromoiodobenzene, m-chloroiodobenzene, p-chloroiodobenzene, p-bromoiodobenzene, and the like to form an intermediate product represented by the formula:

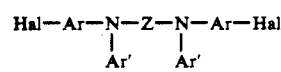

wherein: Z, Ar and Ar' are as defined above, Hal is bromine, chlorine or iodine. The bromine atoms in this intermediate product are thereafter are replaced by lithium. The resulting dilithio arylamine compound is reacted with ethylene oxide, formaldehyde, oxatane, or tetrahydrofuran. This reaction is worked up in the presence of an aqueous acid to form a hydroxy alkylene arylamine precursor represented by the formula:

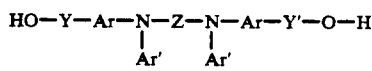

wherein: Z, Ar, Ar', Y, Y' are as defined above. This hydroxy alkylene arylamine precursor is then reacted with the co-reactant diformoyl chloride compound to form a polymeric arylamine of this invention.

The foregoing reactions are more specifically illustrated by the following reactions:

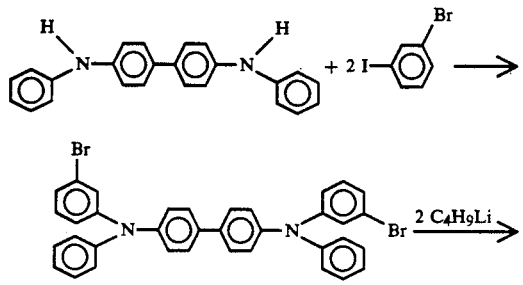

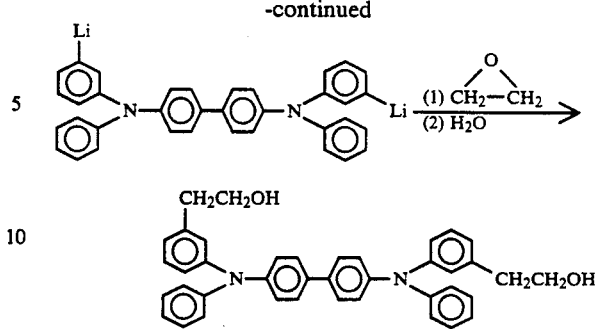

A typical process for preparing a hydroxy alkylene arylamine is disclosed in Examples II and III of U.S. Pat. No. 4,801,517, the entire disclosure of this patent being incorporated herein by reference.

Any suitable solvent may be employed to dissolve the reactants. Typical solvents include tetrahydrofuran, toluene, methylenechloride and the like. Satisfactory yields are achieved with the reaction temperature held near 15° C. during the addition of the reactive halide compound. The reaction time is dependent on the reactants used. Satisfactory results have been achieved within 20 minutes after the final addition of the reactive bisformoylhalide.

One may readily determine whether sufficient reaction product has been formed by monitoring the increase in solution viscosity. An abrupt change in viscosity is noted as the polymerization is nearing completion. Typical polymeric arylamine compounds prepared for the photreceptors of this invention include, for example:

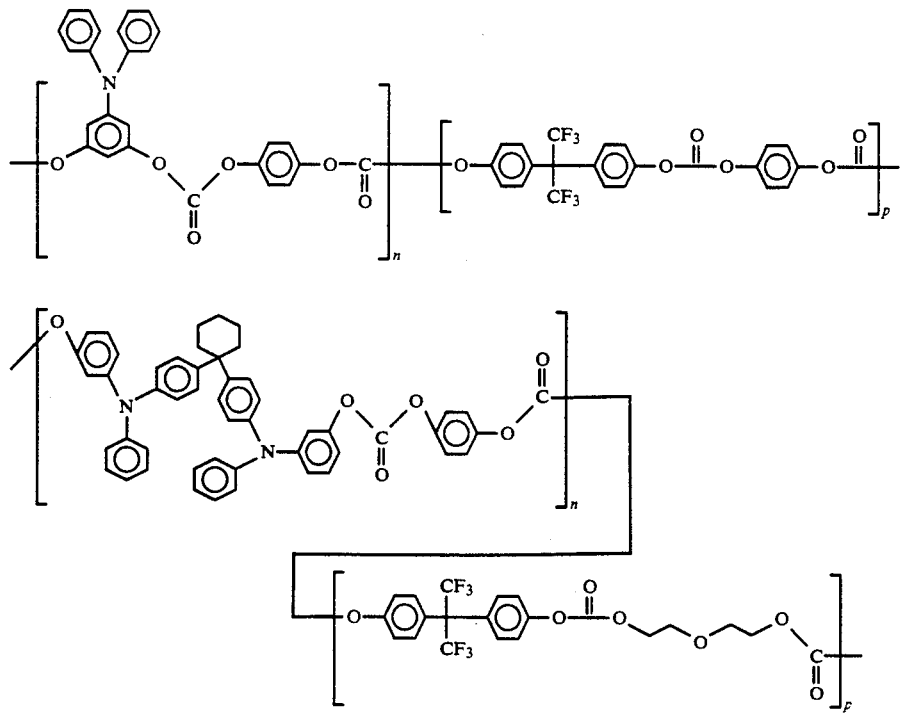

-continued

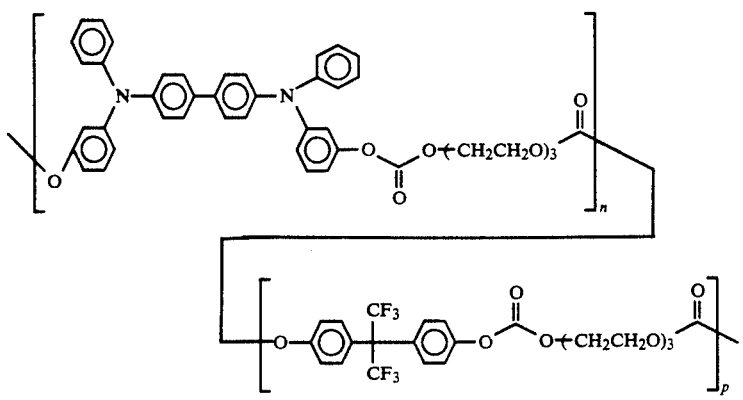

The "n" and "p" in the first appearing formula (FORMULA I) herein are defined as between about 5 and about 5,000. For the final polymers, "n" and "p" are defined as representing numbers sufficient to achieve a weight average molecular weight of between about 20,000 and about 500,000 as represented in FORMULA I.

The following is an illustrative reaction between a specific bisformoyl chloride compound and a specific dihydroxy arylamine compound and the specific bis-trifluoromethyl containing bisphenol compound:

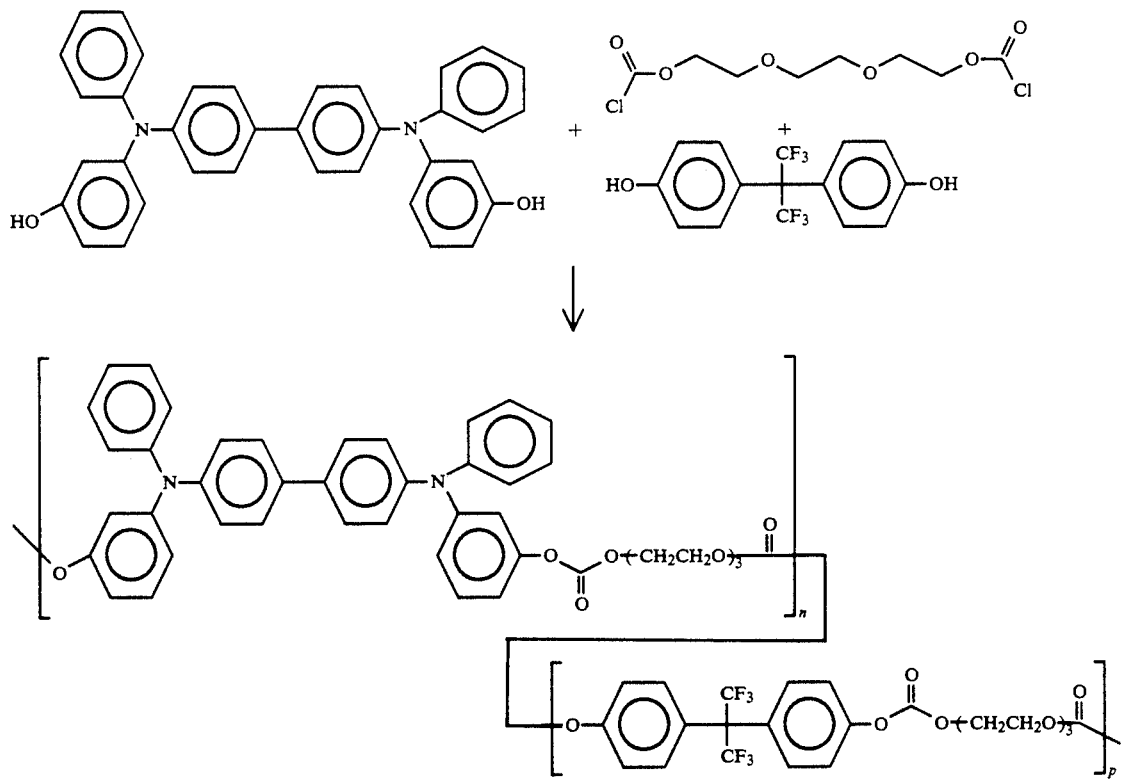

The following is still another illustrative reaction between another specific bis-formoylchloride compound, a specific dihydroxy arylamine compound, and the trifluoromethyl containing bisphenol compound:

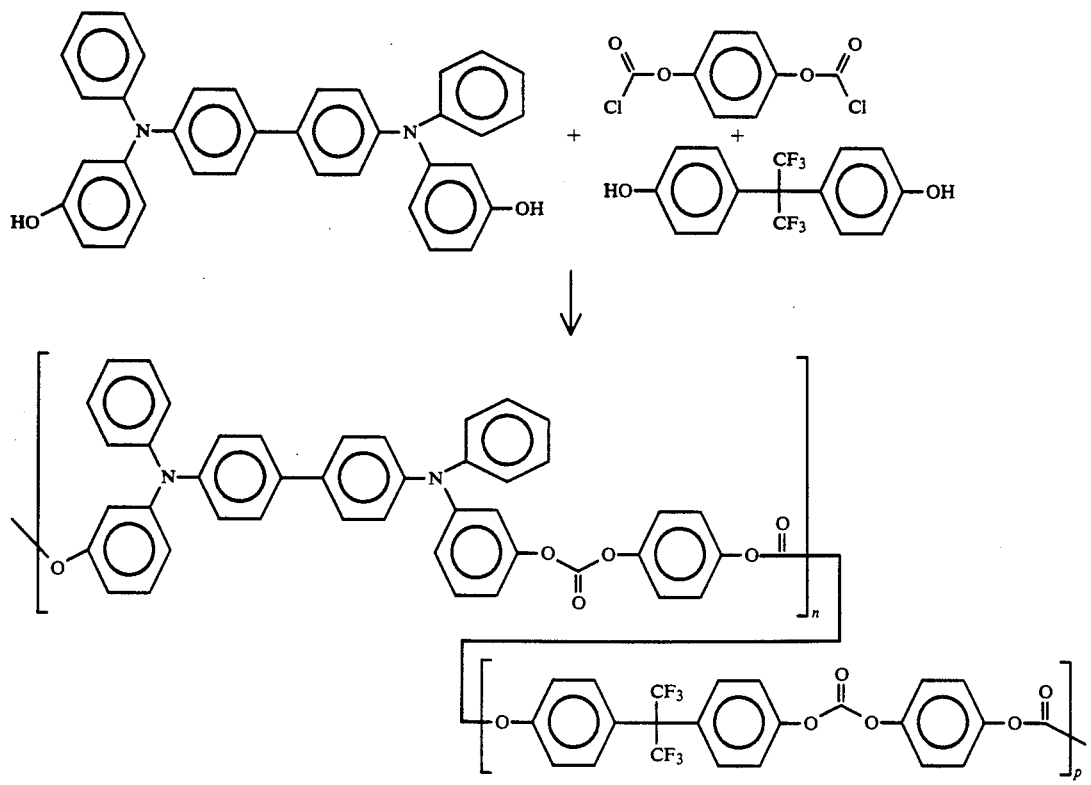

The following is an illustrative reaction between a preferred specific bis-formoylchloride compound, a specific dihydroxy arylamine compound and the bis-trifluoromethyl bisphenol compound:

wherein the value of n was between about 5 and about 5,000 and the value of p was between about 5 and about 5,000. This polymer formed a viscous solution in tetrahydrofuran at a 10 percent by weight polymer concen-

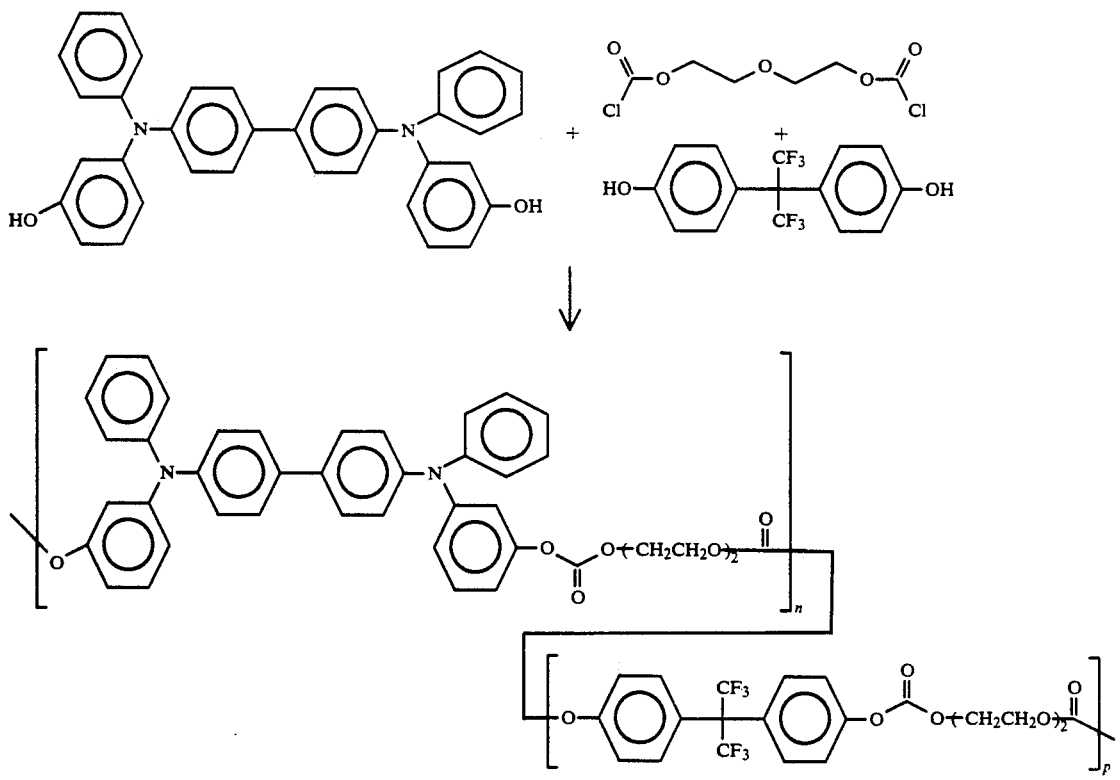

tration thereby further indicating that the material was a high molecular weight condensation polymer of between about 20,000 and about 500,000.

Multilayered photoconductive devices were fabricated with these polymers by applying solutions, e.g. methylene chloride solutions, of the polymers to aluminum substrates bearing about a 0.5 micrometer thick vapor deposited amorphous selenium layer. The deposited charge transport layers were then dried to about a 15 micrometer thickness. These photoconductors were corona charged to a negative potential and thereafter discharged with a monochromatic light source of about 4330 Å wavelength. These photoreceptor devices exhibited low dark decay, high mobility and low residual charge.

The arylamine transporting moieties of the polymers for the imaging members of this invention are rather rigid units, e.g. tetraphenylbenzidine, triphenylamine and the like. When incorporated in polymeric structures, this unit can be considered a rigid-rod unit (RRU). In condensation polymers, rigid-rod structures result in polymers of impaired flexibility, reduced adhesion and a tendency to crack. Counterbalancing this in part is the cohesiveness inherent in most condensation polymers due to the presence of dipole-dipole interaction (in this case the dipole associated with the carbonyl unit). The class of polymers in this invention possesses a flexible unit (FLU) to reduce the brittleness and improve other mechanical properties of the resultant polymer. The flexible units (FLU) in the charge transporting polymers of this invention are derived from the diformoyl chloride compound represented by the generic formula above. In diethylene glycol diformoyl chloride, triethylene glycol diformoyl chloride the presence of ether units and/or methylene units impart a substantial degree of flexibility because it possesses minimal hindrance to bond rotation. Generally, for those applications in which greater flexibility is required, polymers derived from diformoyl chlorides containing ether units and/or methylene units are preferred whereas for those applications in which greater hardness or creep resistance is required, polymers derived from diformoyl chlorides containing aromatic rings and/or double bond units are preferred. Thus, it is possible to tailor the physical properties to the intended use.

The following structures illustrate and compare polyether carbonate structures derived from diformoyl chlorides containing aromatic rings and/or double bond units with polyether carbonate structures derived from diformoyl chlorides containing ether units and/or methylene units. The rigid-rod units (RRU) of the arylamine moiety are represented by rectangles and rigid units associated with specific diformoyl chlorides are shown as crosshatched rectangles. The flexible units (FLU) derived from diformoyl chlorides are shown as springs.

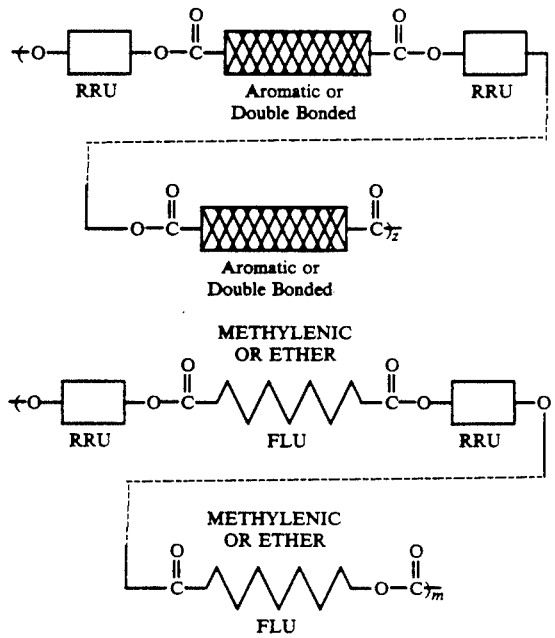

z and m are between about 5 and about 5,000. Thus, the flexible units (FLU) of the polymer of this invention reduce the brittleness and improve other mechanical properties such as tensile toughness whereas the modulus and hardness are increased with polymers derived from diformoyl chlorides containing aromatic rings and/or double bonds compared to polymers having rigid rod units (RRU).

A photoconductive imaging member of this invention may be prepared by providing a substrate having an electrically conductive surface, applying a charge blocking layer on the electrically conductive surface, applying a charge generation layer on the blocking layer and applying a charge transport layer on the charge generation layer. If desired, the charge transport layer may be applied to the electrically conductive surface and the charge generation layer may thereafter be applied to the charge transport layer. The polymeric arylamine of this invention is present in at least the charge generation layer or the charge transport layer. When the photoconductive imaging member of this invention is employed in liquid development systems, the polymeric arylamine of this invention is preferably present in at least the outermost layer of the imaging member.

The substrate may be opaque or substantially transparent and may comprise numerous suitable materials having the required mechanical properties. Accordingly, the substrate may comprise a layer of an electrically non-conductive or conductive material such as an inorganic or an organic composition. As electrically non-conducting materials there may be employed various resins known for this purpose including polyesters, polycarbonates, polyamides, polyurethanes, and the like. The electrically insulating or conductive substrate may be rigid or flexible and may have any number of different configurations such as, for example, a cylinder, sheet, a scroll, and endless flexible belt, and the like. Preferably, the substrate is in the form of an endless flexible belt and comprises a commercially available biaxially oriented polyester known as Mylar, available from E. I. du Pont de Nemours & Co. or Melinex available from ICI.

The thickness of the substrate layer depends on numerous factors, including economical considerations, and thus a layer for a flexible belt may be of substantial thickness, for example, over 200 micrometers, or of minimum thickness less than 50 micrometers, provided there are no adverse affects on the final photoconductive device. In one flexible belt embodiment, the thickness of this layer ranges from about 65 micrometers to about 150 micrometers, and preferably from about 75 micrometers to about 125 micrometers for optimum flexibility and minimum stretch when cycled around small diameter rollers, e.g. 12 millimeter diameter rollers. The surface of the substrate layer is preferably cleaned prior to coating to promote greater adhesion of the deposited coating. Cleaning may be effected by exposing the surface of the substrate layer to plasma discharge, ion bombardment and the like.

The conductive layer may vary in thickness over substantially wide ranges depending on the optical transparency and flexibility desired for the electrophotoconductive member. Accordingly, when a flexible photoresponsive imaging device is desired, the thickness of the conductive layer may be between about 20 angstrom units to about 750 angstrom units, and more preferably from about 50 Angstrom units to about 200 angstrom units for an optimum combination of electrical conductivity, flexibility and light transmission. The conductive layer may be an electrically conductive metal layer formed, for example, on the substrate by any suitable coating technique, such as vacuum depositing technique. Typical metals include aluminum, zirconium, niobium, tantalum, vanadium and hafnium, titanium, nickel, stainless steel, chromium, tungsten, molybdenum, and the like. If desired, an alloy of suitable metals may be deposited. Typical metal alloys may contain two or more metals such as zirconium, niobium, tantalum, vanadium, and hafnium, titanium, nickel, stainless steel, chromium, tungsten, molybdenum, and the like, and mixtures thereof. Regardless of the technique employed to form the metal layer, a thin layer of metal oxide forms on the outer surface of most metals upon exposure to air. Thus, when other layers overlying the metal layer are characterized as "contiguous" layers, it is intended that these overlying contiguous layers may, in fact, contact a thin metal oxide layer that has formed on the outer surface of the oxidizable metal layer. Generally, for rear erase exposure, a conductive layer light transparency of at least about 15 percent is desirable. The conductive layer need not be limited to metals. Other examples of conductive layers may be combinations of materials such as conductive indium tin oxide as a transparent layer for light having a wavelength between about 4000 Angstroms and about 7000 Angstroms or a conductive carbon black dispersed in a plastic binder as an opaque conductive layer.

After deposition of the metal layer, a hole blocking layer may be applied thereto. Generally, electron blocking layers for positively charged photoreceptors allow holes from the imaging surface of the photoreceptor to migrate toward the conductive layer. Any suitable blocking layer capable of forming an electronic barrier to holes between the adjacent photoconductive layer and the underlying conductive layer may be utilized. The blocking layer may be organic or inorganic and may be deposited by any suitable technique. For example, if the blocking layer is soluble in a solvent, it may be applied as a solution and the solvent can subsequently be removed by any conventional method such as by drying. Typical blocking layers include polyvinylbutyral, organosilanes, epoxy resins, polyesters, polyamides, polyurethanes, pyroxyline vinylidene chloride resin, silicone resins, fluorocarbon resins and the like containing an organo metallic salt. Other blocking layer materials include nitrogen containing siloxanes or nitrogen containing titanium compounds such as trimethoxysilyl propylene diamine, hydrolyzed trimethoxysilyl propyl ethylene diamine, N-beta-(aminoethyl) gamma-aminopropyl trimethoxy silane, isopropyl 4-aminobenzene sulfonyl, di(dodecylbenzene sulfonyl) titanate, isopropyl di(4-aminobenzoyl) isostearoyl titanate, isopropyl tri(N-ethylamino-ethylamino) titanate, isopropyl trianthranil titanate, isopropyl tri(N,N-dimethylethylamino) titanate, titanium-4-amino benzene sulfonat oxyacetate, titanium 4-aminobenzoate isostearate oxyacetate, $[H_2N(CH_2)_4]CH_3Si(OCH_3)_2$, (gamma-aminobutyl)methyl diethoxysilane, and $[H_2N(CH_2)_3]Si(OCH_3)_2$ (gamma-aminopropyl) methyl diethoxysilane, as disclosed in U.S. Pat. Nos. 4,291,110, 4,338,387, 4,286,033 and 4,291,110. The disclosures of U.S. Pat. Nos. 4,338,387, 4,286,033 and 4,291,110 are incorporated herein in their entirety.

The blocking layer should be continuous and have a thickness of less than about 0.5 micrometer because greater thicknesses may lead to undesirably high residual voltage. A blocking layer of between about 0.005 micrometer and about 0.3 micrometer (50 Angstroms–3000 Angstroms) is preferred because charge neutralization after the exposure step is facilitated and optimum electrical performance is achieved. A thickness of between about 0.03 micrometer and about 0.06 micrometer is preferred for metal oxide layers for optimum electrical behavior. Optimum results are achieved with a siloxane blocking layer. The blocking layer may be applied by any suitable conventional technique such as spraying, dip coating, draw bar coating, gravure coating, silk screening, air knife coating, reverse roll coating, vacuum deposition, chemical treatment and the like. For convenience in obtaining thin layers, the blocking layers are preferably applied in the form of a dilute solution, with the solvent being removed after deposition of the coating by conventional techniques such as by vacuum, heating and the like. Generally, a weight ratio of blocking layer material and solvent of between about 0.05:100 and about 0.5:100 is satisfactory for spray coating. This siloxane coating is described in U.S. Pat. No. 4,464,450 to L. A. Teuscher, the disclosure of this patent being incorporated herein in its entirety.

If desired, any suitable adhesive layer may be applied to the hole blocking layer. Typical adhesive layers include a polyester resin such as Vitel PE-100, Vitel PE-200, Vitel PE-200D, and Vitel PE-222, all available from Goodyear Tire and Rubber Co., polyvinyl butyral, duPont 49,000 polyester, and the like. When an adhesive layer is employed, it should be continuous and preferably, has a dry thickness between about 200 angstroms and about 900 angstroms and more preferably between about 400 angstroms and about 700 angstroms. Any suitable solvent or solvent mixtures may be employed to form a coating solution of the adhesive layer material. Typical solvents include tetrahydrofuran, toluene, methylene chloride, cyclohexanone, and the like, and mixtures thereof. Generally, to achieve a continuous adhesive layer thickness of about 900 angstroms or less by gravure coating techniques, the solids concentration are between about 2 percent and about 5 percent by weight based on the total weight of the coating mixture of resin and solvent. However, any other suitable and conventional technique may be utilized to mix and thereafter apply the adhesive layer coating mixture to the charge blocking layer. Typical application techniques include spraying, dip coating, roll coating, wire wound rod coating, and the like. Drying of the deposited coating may be effected by any suitable conventional technique such as oven drying, infra red radiation drying, air drying and the like.

Any suitable photogenerating layer may be applied to the blocking layer or intermediate layer if one is employed, which can then be overcoated with a contiguous hole transport layer as described. Examples of photogenerating layers include inorganic photoconductive particles such as amorphous selenium, trigonal selenium, and selenium alloys selected from the group consisting of selenium-tellurium, selenium-tellurium-arsenic, selenium arsenide and mixtures thereof, and organic photoconductive particles including various phthalocyanine pigment such as the X-form of metal free phthalocyanine described in U.S. Pat. No. 3,357,989, metal phthalocyanines such as vanadyl phthalocyanine and copper phthalocyanine, quinacridones available from DuPont under the trade name Monastral Red, Monastral violet and Monastral Red Y, Vat orange 1 and Vat orange 3 trade names for dibromo anthanthrone pigments, benzimidazole perylene, substituted 2,4-diamino-triazines disclosed in U.S. Pat. No. 3,442,781, polynuclear aromatic quinones available from Allied Chemical Corporation under the tradename Indofast Double Scarlet, Indofast Violet Lake B, Indofast Brilliant Scarlet and Indofast Orange, and the like dispersed in a film forming polymeric binder. Selenium, selenium alloy, benzimidazole perylene, and the like and mixtures thereof may be formed as a continuous, homogeneous photogenerating layer. Benzimidazole perylene compositions are well known and described, for example in U.S. Pat. No. 4,587,189, the entire disclosure thereof being incorporated herein by reference. Multi-photogenerating layer compositions may be utilized where a photoconductive layer enhances or reduces the properties of the photogenerating layer. Examples of this type of configuration are described in U.S. Pat. No. 4,415,639, the entire disclosure of this patent being incorporated herein by reference. Other suitable photogenerating materials known in the art may also be utilized, if desired. Charge generating binder layer comprising particles or layers comprising a photoconductive material such as vanadyl phthalocyanine, metal free phthalocyanine, benzimidazole perylene, amorphous selenium, trigonal selenium, selenium alloys such as selenium-tellurium, selenium-tellurium-arsenic, selenium arsenide, and the like and mixtures thereof are especially preferred because of their sensitivity to white light. Vanadyl phthalocyanine, metal free phthalocyanine and tellurium alloys are also preferred because these materials provide the additional benefit of being sensitive to infrared light.

Numerous inactive resin materials may be employed in the photogenerating binder layer including those described, for example, in U.S. Pat. No. 3,121,006, the entire disclosure of which is incorporated herein by reference. Typical organic resinous binders include thermoplastic and thermosetting resins such as polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl acetate, polysiloxanes, polyacrylates, polyvinyl acetals, polyamides, polyimides, amino resins, phenylene oxide resins, terephthalic acid resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly(amide-imide), styrene-butadiene copolymers, vinylidenechloride-vinylchloride copolymers, vinylacetate-vinylidenechloride copolymers, styrene-alkyd resins, and the like. These polymers may be block, random or alternating copolymers.

Active carrier transporting resin may also be employed as the binder in the photogenerating layer. These resins are particularly useful where the concentration of carrier generating pigment particles is low and the thickness of the carrier generation layer is substantially thicker than about 0.7 micrometer. The active resin commonly used as a binder is polyvinylcarbazole whose function is to transport carriers which would otherwise be trapped in the layer.

The electrically active polymeric amines for the imaging members of this invention can be employed in the generation layer replacing the polyvinylcarbazole binder or any other active or inactive binder. Thus, for example, all of the active resin materials to be employed in the generator layer may be replaced by the electrically active polymeric arylamines of this invention.

The photogenerating composition or pigment is present in the resinous binder composition in various amounts, generally, however, from about 5 percent by volume to about 90 percent by volume of the photogenerating pigment is dispersed in about 10 percent by volume to about 95 percent by volume of the resinous binder, and preferably from about 20 percent by volume to about 30 percent by volume of the photogenerating pigment is dispersed in about 70 percent by volume to about 80 percent by volume of the resinous binder composition. In one embodiment about 8 percent vy volume of the photogenerating pigment is dispersed in about 92 percent by volume of the resinous binder composition.

For embodiments in which the photogenerating layers do not contain a resinous binder, the photogenerating layer may comprise any suitable, well known homogeneous photogenerating material. Typical homogeneous photogenerating materials include inorganic photoconductive compounds such as amorphous selenium, selenium alloys selected such as selenium-tellurium, selenium-tellurium-arsenic, and selenium arsenide and organic materials such as vanadyl phthalocyanine, chlorindium phthalocyanine.

The photogenerating layer containing photoconductive compositions and/or pigments and the resinous binder material generally ranges in thickness of from about 0.1 micrometer to about 5 micrometers, and preferably has a thickness of from about 0.3 micrometer to about 3 micrometers. The photogenerating layer thickness is related to binder content. Higher binder content compositions generally require thicker layers for photogeneration. Thicknesses outside these ranges can be selected providing the objectives of the present invention are achieved.

The active charge transport layer may comprise a polymeric aryl amine of this invention capable of supporting the injection of photogenerated holes from the charge generation layer and allowing the transport of these holes through the transport layer to selectively discharge the surface charge. When the photogenerating layer is sandwiched between the conductive layer and the active charge transport layer, the transport layer not only serves to transport holes, but also protects the photoconductive layer from abrasion or chemical attack and therefore extends the operating life of the electrophotographic imaging member. The charge transport layer should exhibit negligible, if any, discharge when exposed to a wavelength of light useful in xerography, e.g. 4000 angstroms to 9000 angstroms. Therefore, the charge transport layer is substantially transparent to radiation in a region in which the photoconductor is to be used. Thus, the active charge transport layer is a substantially nonphotoconductive material which supports the injection of photogenerated holes from the generation layer. The active transport layer is normally transparent when exposure is effected through the active layer to ensure that most of the incident radiation is utilized by the underlying charge carrier generator layer for efficient photogeneration. When used with a transparent substrate, imagewise exposure may be accomplished through the substrate with all light passing through the substrate. In this case, the active transport material need not be transmitting in the wavelength region of use. The charge transport layer in conjunction with the generation layer in the instant invention is a material which is an insulator to the extent that an electrostatic charge placed on the transport layer is not conducted in the absence of illumination.

The transport material comprising a hole transporting small molecule-inactive resin binder composition may be entirely replaced with 100 percent of a polymeric arylamine compound of this invention. In addition the binder used in a charge generating layer may be replaced with 100 percent of a polymeric arylamine compound of this invention. The use of a polymeric arylamine of this invention as the transport layer does not necessitate nor preclude the use of a polymeric arylamine, of this invention, as the binder in the charge generator layer. Additionally, its use as the charge generator layer binder does not necessitate nor preclude the use of a polymeric arylamine of this invention as the charge transport layer. When the polymeric arylamine of this invention is used as the active binder in the the charge generator layer, it can be present in the range of between about 10 percent by volume and about 95 percent by volume, and preferably between about 20 percent by volume to about 30 percent by volume, the balance of which being made up of the photogenerating pigment. Any substituents in the polymeric arylamine compound should be free from electron withdrawing groups such as $NO_2$ groups, CN groups, and the like.

Any suitable solvent may be employed to apply the transport layer material to the underlying layer. Typical solvents include methylene chloride, toluene, tetrahydrofuran, and the like. The selection of the solvent is determined in part by the coating method and the solvent characteristics of the other functional layers in the photoresponsive device. Methylene chloride solvent is a particularly desirable component of the charge transport layer coating mixture for adequate dissolution of all the components and for its low boiling point.

Any suitable and conventional technique may be utilized to mix and thereafter apply the charge transport layer coating mixture to the underlying surface, e.g. charge generating layer. Typical application techniques include spraying, dip coating, roll coating, wire wound rod coating, and the like. Drying of the deposited coating may be effected by any suitable conventional technique such as oven drying, infrared radiation drying, air drying and the like.

Generally, the thickness of the hole transport layer is between about 5 to about 100 micrometers, but thicknesses outside this range can also be used. The hole transport layer should be an insulator to the extent that the electrostatic charge placed on the hole transport layer is not conducted in the absence of illumination at a rate sufficient to prevent formation and retention of an electrostatic latent image thereon. In general, the ratio of the thickness of the hole transport layer to the charge generator layer is preferably maintained from about 2:1 to 200:1 and in some instances as great as 400:1.

Other layers such as conventional ground strips comprising, for example, conductive particles dispersed in a film forming binder may be applied to one edge of the photoreceptor in contact with the conductive surface, blocking layer, adhesive layer or charge generating layer.

Optionally, an overcoat layer may also be utilized to improve resistance to abrasion. In some cases a back coating may be applied to the side opposite the photoreceptor to provide flatness and/or abrasion resistance. These overcoating and backcoating layers may comprise organic polymers or inorganic polymers that are electrically insulating or slightly semi-conductive.

The electrophotographic member of the present invention containing the electrically active polymeric arylamine in at least the generator or transport layer may be employed in any suitable and conventional electrophotographic imaging process which utilizes charging prior to imagewise exposure to activating electromagnetic radiation. Conventional positive or reversal development techniques may be employed to form a marking material image on the imaging surface of the electrophotographic imaging member of this invention. Thus, by applying a suitable electrical bias and selecting toner having the appropriate polarity of electrical charge, one may form a toner image in the negatively charged areas or discharged areas on the imaging surface of the electrophotographic member of the present invention. More specifically, for positive development, charged toner particles of one polarity are attracted to the oppositely charged electrostatic areas of the imaging surface and for reversal development, charged toner particles are attracted to the discharged areas of the imaging surface. Where the transport layer of this invention is sandwiched between a photogenerating layer and a conductive surface, a positive polarity charge is normally applied prior to imagewise exposure to activating electromagnetic radiation. Where the photogenerating layer is sandwiched between a transport layer and a conductive surface, a negative polarity charge is normally applied prior to imagewise exposure to activating electromagnetic radiation. As is well known in the art, the conductive layer may be omitted and the opposite sides of the generator and transport layer assembly may be simultaneously charged with charges of opposite polarity to achieve the equivalent effect of a conductive layer.

The electrophotographic member of the present invention exhibits greater resistance to delamination, cracking, crazing, crystallization of arylamine compounds, phase separation of arylamine compounds and leaching of arylamine compounds during cycling if exposed to a xerographic liquid developer.

The invention will now be described in detail with respect to the specific preferred embodiments thereof, it being understood that these examples are intended to be illustrative only and that the invention is not intended to be limited to the materials, conditions, process parameters and the like recited herein. All parts and percentages are by weight unless otherwise indicated.

EXAMPLE I

Into a 500 milliliter three-necked round bottom flask equipped with a mechanical stirrer, an argon gas inlet, a thermometer and a dropping funnel was placed 13 grams N,N'-diphenyl-N,N'-bis-(3-hydroxyphenyl)-[1,1'-biphenyl]-4,4'diamine (0.025 mole), prepared following the procedure of Example II in U.S. Pat. No. 4,806,443, 5.0 grams 4,4'-(hexafluoroisopropylidene)diphenol (0.015 mole), 150 milliliters tetrahydrofuran, 16.8 milliliters triethylamine (0.12 mole). The contents of the flask were maintained at 15° C. with a water bath throughout the dropwise addition of 6.8 milliliters of diethyleneglycol bis-chloroformate (0.041 mole) dissolved in 50 milliliters tetrahydrofuran. A colorless precipitate of triethylamine hydrochloride formed after approximately 5 drops of chloroformate solution had been added.

After 60 minutes, the addition was complete and the viscous solution was allowed to stir for 15 minutes. The polymer solution was filtered to remove the triethylamine hydrochloride. The pale yellow polymer solution was precipitated into methanol, filtered and dried. Yield 22.5 grams.

The dried polymer was dissolved in 200 milliliters tetrahydrofuran and stirred with 5 grams F-20 alumina (Alcoa) for 2 hours. The mixture was filtered and the alumina was washed with 10 milliliters tetrahydrofuran. The combined filtrates were precipitated into methanol, filtered and dried. Yield 21.0 grams. MW 91,000

EXAMPLE II

Into a 500 milliliter three-necked round bottom flask equipped with a mechanical stirrer, an argon gas inlet, a thermometer and a dropping funnel was placed 10.4 grams N,N'-diphenyl-N,N'-bis-(3-hydroxyphenyl)-[1,1'-biphenyl]-4,4'diamine (0.02 mole), prepared following the procedure of Example II in U.S. Pat. No. 4,806,443, 6.7 grams 4,4'-(hexafluoroisopropylidene)diphenol (0.02 mole), 150 milliliters tetrahydrofuran, 16.8 milliliters triethylamine (0.12 mole). The contents of the flask were maintained at 15° C. with a water bath throughout the dropwise addition of 6.8 milliliters of diethyleneglycol bis-chloroformate (0.041 mole) dissolved in 50 milliliters tetrahydrofuran. A colorless precipitate of triethylamine hydrochloride formed after approximately 5 drops of chloroformate solution had been added.

After 60 minutes, the addition was complete and the viscous solution was allowed to stir for 15 minutes. The polymer solution was filtered to remove the triethylamine hydrochloride. The pale yellow polymer solution was precipitated into methanol, filtered and dried. Yield 22.0 grams.

The dried polymer was dissolved in 200 milliliters tetrahydrofuran and stirred with 5 grams F-20 alumina (Alcoa) for 2 hours. The mixture was filtered and the alumina was washed with 10 milliliters tetrahydrofuran. The combined filtrates were precipitated into methanol, filtered and dried. Yield 21.0 grams. MW 96,000

EXAMPLE III

A photosensitive member having a conductive layer, barrier layer, charge generation layer, and charge transport layer was prepared. An epoxy phenolic barrier layer about 0.5 micrometer thick was formed on a 3 mil aluminum substrate by dip coating. A 1 micrometer thick layer of amorphous selenium was then vacuum evaporated on the coated aluminum substrate by a conventional vacuum deposition technique similar to the technique disclosed in Bixby in U.S. Pat. Nos. 2,753,278 and 2,970,906. More specifically, vacuum deposition was carried out at a vacuum of $10^{-6}$ Torr while the substrate was maintained at a temperature of about 50° C. during the vacuum deposition. A charge transport layer was prepared by dissolving 1.5 grams of charge transporting polymer described in Example I, in 10.0 milliliters of tetrahydrofuran. A layer of this mixture was formed on amorphous selenium layer using a Bird film applicator. The coating was then vacuum dried at 40° C. for 18 hours to form a 22 micrometer thick dry layer of the charge transport material. The plate was tested for its photoconductive property by first negatively corona charging to a field of 50 volts/micron and exposing to a blue light flash of 4330 Å wavelength, 2 microseconds duration and 25 ergs/cm$^2$ light intensity. The device discharged to a very low potential of less than 50 volts indicating good photoconductive properties.

EXAMPLE IV

A charge transport layer was prepared by dissolving 10 milliliters of cyclohexanone and 1.5 grams of the polymer from Example I. A layer of this mixture was formed on a 0.2 micrometer vapor deposited As$_2$Se$_3$ layer on an aluminum substrate, using a Bird film applicator. The coating was then vacuum dried at 100° C. for one hour to form a 22 micrometer thick dry layer of the charge transport material. The plate was tested for its photoconductive property by first negatively corona charging to a field of 50 volts/micrometer and exposing to a blue light flash of 4330 Å wavelength, 2 microseconds duration, and 25 ergs/cm$^2$ light intensity. The device discharged to a very low potential of less than 50 volts indicating good photoconductive properties. The member was then subjected to a cyclic operation of charge-expose and erase cycles in a scanner, and was found to be stable even after 10,000 cycles of essentially continuous operation.

EXAMPLE V

A charge transport layer was prepared by dissolving 10 milliliters of cyclohexanone and 1.5 grams of the polymer described in Example II. A layer of this mixture is formed on a 0.2 micrometer thick vapor deposited As$_2$Se$_3$ layer on an aluminum substrate, using a Bird film applicator. The coating was then vacuum dried at 100° C. for one hour to form a 22 micrometer thick dry layer of the charge transport material. The plate was tested for its photoconductive property by first negatively corona charging to a field of 50 volts/micrometer and exposing to a blue light flash of 4330 Å wavelength, 2 microseconds duration, and 25 ergs/cm$^2$ light intensity. The device discharged to a very low potential of less than 50 volts indicating good photoconductive properties. The member was then subjected to a cyclic operation of charge-expose and erase cycles in a scanner, and was found to be stable even after 10,000 cycles of essentially continuous operation.

EXAMPLE VI

An electrophotographic imaging member was prepared by forming coatings using conventional coating techniques on a substrate comprising vacuum deposited titanium layer on a thin flexible polyethylene terephthalate film (Mylar, available from E. I. duPont de Nemours & Co.). The first coating was a siloxane barrier layer formed from hydrolyzed gamma aminopropyltriethoxysilane having a thickness of 50 angstroms. This film was coated with 3-aminopropyltriethoxysilane (available from PCR Research Chemicals of Florida) mixed with ethanol in a 1:50 volume ratio. The film was applied to a wet thickness of 0.5 mil by a multiple clearance film applicator. The layer was then allowed to dry for 5 minutes at room temperature, followed by curing for 10 minutes at 110 degree centigrade in a forced air oven. The second coating was an adhesive layer of polyester resin (49,000, available from E. I. duPont de Nemours & Co.) having a thickness of 50 angstroms and was coated with a solution of 0.5 grams of 49,000 resin dissolved in 70 grams of tetrahydrofuran and 29.5 grams of cyclohexanone. The film was applied with a 0.5 mil bird film applicator and cured in a forced air oven for 10 minutes. The next coating was a charge generator layer containing 35 percent by weight vanadyl phthalocyanine particles dispersed in a polyester resin (Vitel PE100, available from Goodyear Tire and Rubber Co.) having a thickness of 1 micrometer. The coating mixture was prepared by roll milling 0.35 gram of vanadyl phthalocyanine pigment and 0.65 gram of polyester (Vitel PE100, available from Goodyear Tire & Rubber Co.) for 24 hours employing stainless steel shot in a mixture of solvents containing 12.4 grams of methylene chloride and 5.8 grams of dichloroethane. The film was coated utilizing a 0.5 mil bird film applicator and cured at 100 degree centigrade for 10 minutes. The top coating was solution cast as a charge transport layer of a copolymer containing 4,4'-(hexafluoro isopropylidine)diphenol having a thickness of 20 micrometers. The transport layer was fabricated by first dissolving 1.2 grams of the 4,4'-(hexafluoro isopropylidine)diphenol containing copolymer form example I in 10.6 grams of methylene chloride. After dissolution, the mixture was coated on the substrate containing the charge generator layer using a 6 mil Bird film applicator. The film was dried in a forced air oven at 100° C. for 20 minutes. The resulting electrophotographic imaging member was mounted on a cylindrical aluminum drum which was rotated on a shaft. The film was charged by a corotron mounted along the circumference of the drum. The surface potential was measured as a function of time by several capacitively coupled probes placed at different locations around the shaft. The probes were calibrated by applying known potentials to the drum substrate. The imaging member on the drum was exposed and erased by light sources located at appropriate positions around the drum. The measurement consisted of charging the imaging member in a constant current or voltage mode. As the drum rotated, the initial charging potential was measured by probe 1. Further rotation led to the exposure station, where the photoconductor device was exposed to monochromatic radiation of a known intensity. The surface potential after exposure was measured by probes 2 and 3. The device was finally exposed to an erase lamp of appropriate intensity and any residual potential was measured by probe 4. The process was repeated with the magnitude of the exposure automatically changed during the next cycle. A photo induced discharge characteristics (PIDC) was obtained by plotting the potentials at probes 2 and 3 as a function of exposure. Good sensitivities were observed in both the visible range (4000 Å–6500 Å) and infrared range (7000 Å–8000 Å). The optimum light energy required to generate a maximum contrast of 600 volts for a 1.0 neutral density image was found to be 15 and 12 ergs/cm$^2$ in the visible and infrared range respectively. The device was cycled continuously for 10,000 cycles of charge, expose and erase steps and found to have stable potentials during the charging, after the exposure and following the erase steps.

EXAMPLE VII

An electrophotographic imaging member was prepared by forming coatings using conventional coating techniques on a substrate comprising vacuum deposited titanium layer on a thin, flexible polyethylene terephthalate film (Mylar, available from E. 1. duPont de Nemours & Co.). The first coating was a siloxane barrier layer formed from hydrolyzed gamma aminopropyltriethoxysilane having a thickness of 100 angstroms. The second coating was an adhesive layer of polyester resin (49,000, available from E. I. duPont de Nemours & Co.) having a thickness of 50 angstroms. The next coating was a charge generator layer coated from a solution containing 0.8 gram trigonal selenium having a particle size of about 0.05 micrometer to 0.2 micrometer and about 0.8 gram poly(N-vinyl carbazole) in about 7 milliliters of tetrahydrofuran and about 7 milliliters toluene. The generator layer coating was applied with a 0.005 inch Bird applicator and the layer was dried at about 135° C. in a forced air oven to form a layer having a 1.6 micrometer thickness. The top coating was a charge transport layer of a copolymer containing 4,4'-(hexafluoro isopropylidine)diphenol from Example 1 having a thickness of 20 micrometers. The transport layer was fabricated by first dissolving 1.2 grams of the 4,4'-(hexafluoro isopropylidine)diphenol copolymer of example 1 in 10 grams of toluene. After dissolution, the mixture was coated on the substrate containing the charge generator layer using a 6 mil Bird film applicator. The film was dried in a forced air oven at 100° C. for 20 minutes. The device was mounted on a cylindrical aluminum drum which was rotated on a shaft. The PIDC characteristics were measured by the procedure described in Example VI. Good sensitivity was obtained when exposed to visible light. The optimum light energy required to generate a maximum contrast of 600 volts for 1.0 neutral density image was found to be 10 ergs/cm$^2$. The device was cycled continuously for 10,000 cycles of charge, expose and erase steps and found to have stable potentials during the charging, after the exposure and following the erase steps.

EXAMPLE VIII

A photoreceptor was prepared by forming coatings using conventional techniques on a substrate comprising vacuum deposited titanium layer on a thin, flexible polyethylene terephthalate film (Melinex, available from E. I. duPont de Nemours & Co.). The first coating was a siloxane barrier layer having a thickness of 100 angstroms formed from hydrolyzed gamma aminopropyltriethoxysilane. The second coating was an adhesive layer of polyester resin (49,000, available from E. I. duPont de Nemours & Co.) having a thickness of 50 angstroms. A 0.5 micrometer thick amorphous selenium layer was vacuum deposited on the adhesive layer. The top coating was a charge transport layer of a copolymer containing 4,4'-(hexafluoro isopropylidine)diphenol having a thickness of 20 micrometers. The transport layer was fabricated by first dissolving 1.2 grams of the 4,4'-(hexafluoro isopropylidine)diphenol copolymer from Example II in 10.6 grams of methylene chloride. After dissolution, the mixture was coated on the substrate containing the charge generator layer using a 6 mil Bird film applicator. The film was dried in a forced air oven at 30° C. for 20 minutes. The resulting photoreceptor device was mounted on a cylindrical aluminum drum which was rotated on a shaft. The PIDC characteristics were measured by the procedure described in Example VI. Good sensitivity was obtained when exposed to visible light. The optimum light energy required to generate a maximum contrast of 600 volts for a 1.0 neutral density image was found to be 25 ergs/cm². The device was cycled continuously for 10,000 cycles of charge, expose and erase steps and found to have stable potentials during the charging, after the exposure and following the erase steps.

Although the invention has been described with reference to specific preferred embodiments, it is not intended to be limited thereto, rather those skilled in the art will recognize that variations and modifications may be made therein which are within the spirit of the invention and within the scope of the claims.

What is claimed is:

1. An electrostatographic imaging member comprising a support layer and at least one electrophotoconductive layer, said imaging member comprising a polyarylamine polymer represented by the formula:

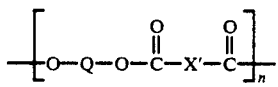

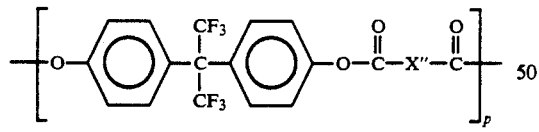

wherein:
n is between about 5 and about 5,000
p is between about 5 and about 5,000
X' and X" are independently selected from a group having bifunctional linkages,
Q is a divalent group derived from a hydroxy terminated arylamine reactant containing the group:

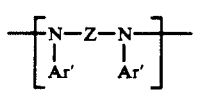

or

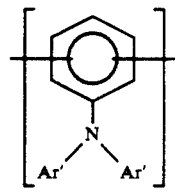

wherein:
Ar' is selected from the group consisting of:

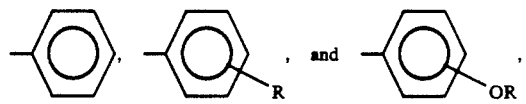

Z is selected from the group consisting of:

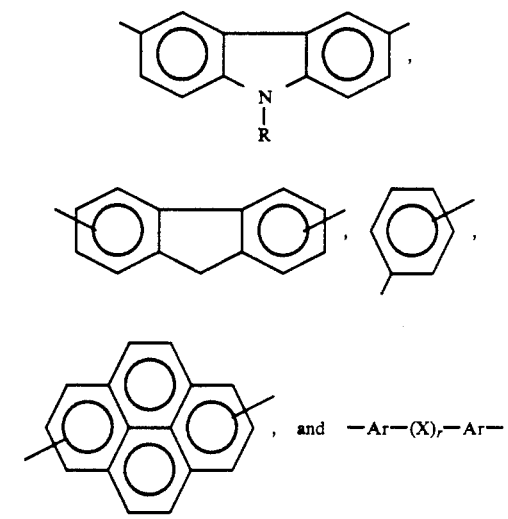

r is 0 or 1,
R is selected from the group consisting of —CH₃, —C₂H₅, —C₃H₇, and —C₄H₉,
Ar is selected from the group consisting of:

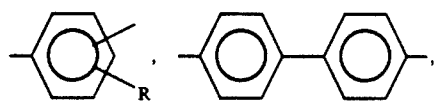

and

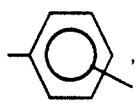

X is selected from the group consisting of:

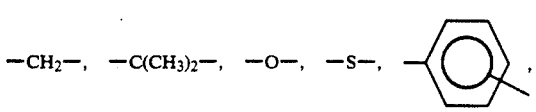

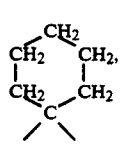 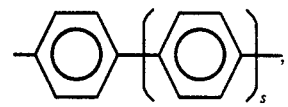,

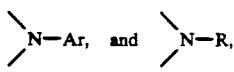

and the weight average molecular weight of the polyarylamine polymer is between about 10,000 and about 1,000,000.

2. An electrostatographic imaging member according to claim 1 wherein said imaging member comprises a charge generating layer and a charge transport layer.

3. An electrostatographic imaging member according to claim 2 wherein said charge transport layer comprises said polyarylamine polymer.

4. An electrostatographic imaging member according to claim 2 wherein said charge generating layer comprises said polyarylamine polymer.

5. An electrostatographic imaging member according to claim 2 wherein said imaging member comprises a protective overcoating comprising said arylamine compound.

6. An electrostatographic imaging member comprising a support layer and at least one electrophotoconductive layer, said imaging member comprising a polyarylamine polymer represented by the formula:

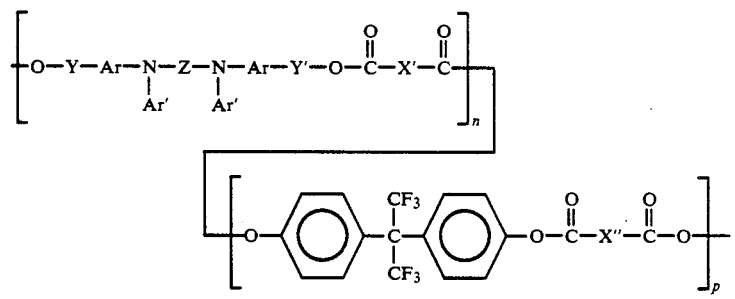

wherein:
n is between about 5 and about 5,000,
p if between about 5 and about 5,000,
Z is selected from the group consisting of:

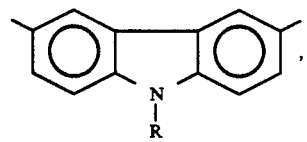

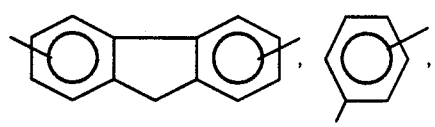

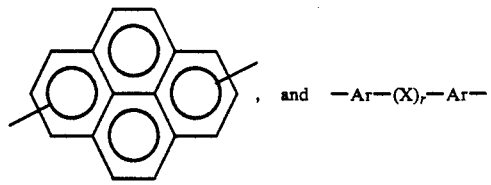, and —Ar—(X)$_r$—Ar— r is 0 or 1,
Ar is selected from the group consisting of:

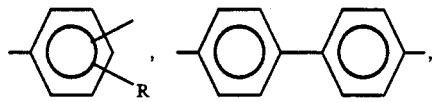

and

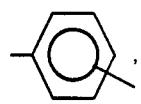,

R is selected from the group consisting of —CH$_3$, —C$_2$H$_5$, —C$_3$H$_7$. and —C$_4$H$_9$,
X is selected from the group consisting of:

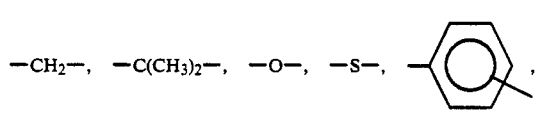

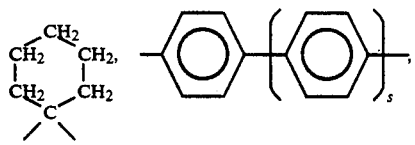

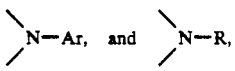

s is 0, 1 or 2,
Ar' is selected from the group consisting of:

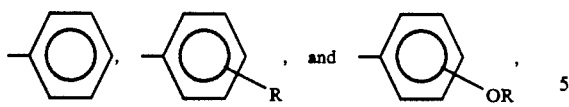

X' AND X" are independently selected from a group having bifunctional linkages, and Y and Y' are independently selected from a group represented by the formula:

$-(CH_2)_t-$ wherein t is 0, 1, 2, 3, or 4.

7. An electrophotographic imaging process comprising forming an electrostatic latent image on the imaging surface of an electrostatographic imaging member comprising a support layer and at least one electrophotoconductive layer, said imaging member comprising a polyarylamine polymer represented by the formula:

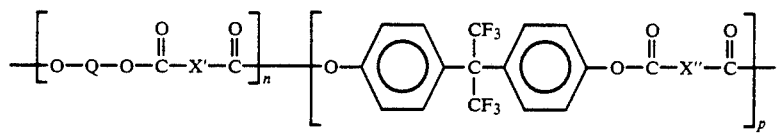

wherein:

n is between about 5 and about 5,000 p is between about 5 and about 5,000

X' and X" are independently selected from a group having bifunctional linkages,

Q is a divalent group derived from a hydroxy terminated arylamine reactant containing the group:

$$\begin{bmatrix} N-Z-N \\ | \quad\quad | \\ Ar' \quad Ar' \end{bmatrix}$$

or $$\begin{bmatrix} \text{[phenyl ring with N]} \\ Ar' \quad Ar' \end{bmatrix}$$

wherein:

Ar' is selected from the group consisting of:

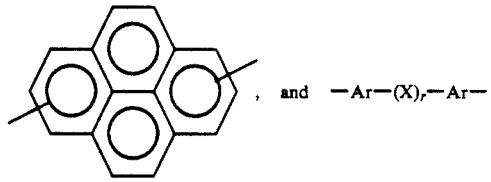

Z is selected from the group consisting of:

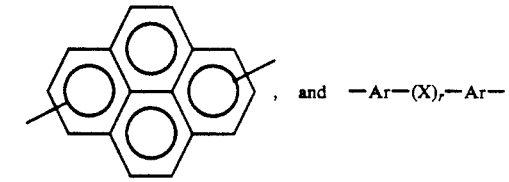

r is 0 or 1,

Ar is selected from the group consisting of:

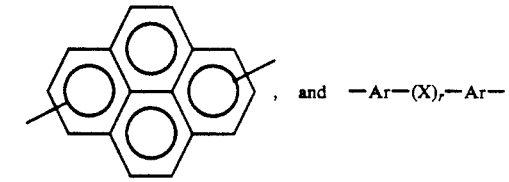

and

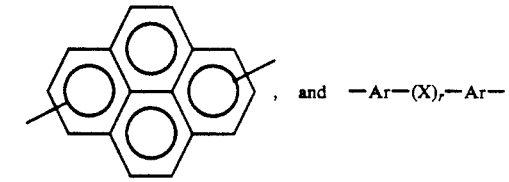

R is selected from the group consisting of —CH₃, —C₂H₅, —C₃H₇, and —C₄H₉,

X is selected from the group consisting of:

—CH₂—, —C(CH₃)₂—, —O—, —S—, 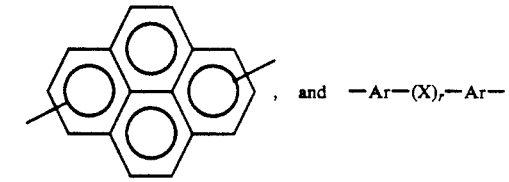,

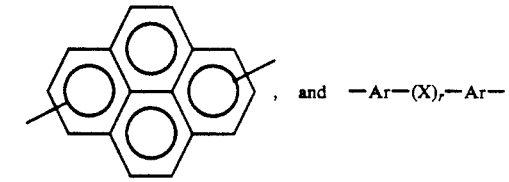

$\diagdown$N—Ar, and $\diagdown$N—R, and the weight average molecular weight of the polyarylamine polymer is between about 10,000 and about 1,000,000, said polyarylamine polymer being substantially non-photoconductive when exposed to radiation having a wavelength between about 4,000 angstroms and about 9,000 angstroms, capable of supporting the injection of photogenerated holes and capable of supporting the transport of said holes, and contacting said imaging member with a developer to deposit toner marking particles on said imaging surface to form a marking particle image in conformance to said electrostatic latent image.

8. An electrophotographic imaging process according to claim 7 wherein said developer is a liquid developer.

9. An electrophotographic imaging process according to claim 7 wherein said liquid developer comprises an organic carrier fluid.

* * * * *